Jan. 28, 1930.

A. E. MAYNARD

FLUID ABRADANT SUPPLYING MEANS

Re. 17,576

Original Filed Dec. 13, 1926

Inventor

Albert E. Maynard

By Harry H. Styll.

Attorney

Reissued Jan. 28, 1930

Re. 17,576

UNITED STATES PATENT OFFICE

ALBERT E. MAYNARD, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

FLUID ABRADANT SUPPLYING MEANS

Original No. 1,666,713, dated April 17, 1928, Serial No. 154,584, filed December 13, 1926. Application for reissue filed July 15, 1929. Serial No. 378,541.

This invention relates to improved means for supplying a fluid abradant to the working parts of a surfacing machine and has particular reference to supplying a fluid abradant to the operating surfaces of tools for surfacing ophthalmic lenses.

The principal object of the invention is to provide fluid abradant supplying means by which the direction at which the abradant is supplied to the tool may be regulated and also by which the amount of abradant so supplied can be regulated.

Another object of the invention is to provide simple, inexpensive and efficient means for directing the direction of the fluid abradant as well as regulating the amount of abradant supplied.

Other objects and advantages of the invention will become apparent from the following description taken in connection with the accompanying drawings and it will be understood that many modifications and changes in the details of construction and arrangement of parts may be made without departing from the spirit of the invention as expressed in the accompanying claims. I, therefore, do not wish to be limited to the exact details shown and described, the preferred forms only having been shown by way of illustration.

Referring to the drawings.

Figure 1:
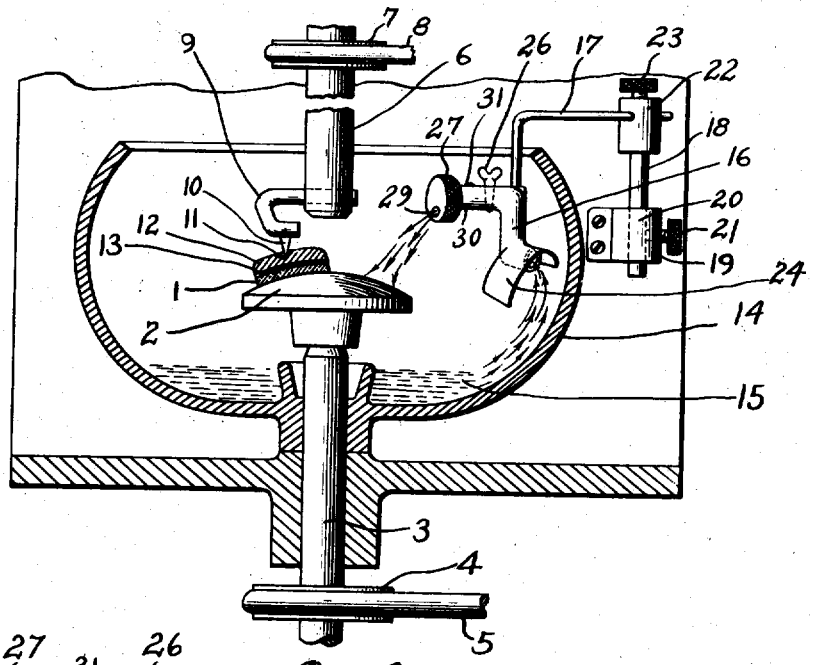
Figure 1 is a partial longitudinal cross section showing the application of the invention to a surfacing machine.
Figure 2:
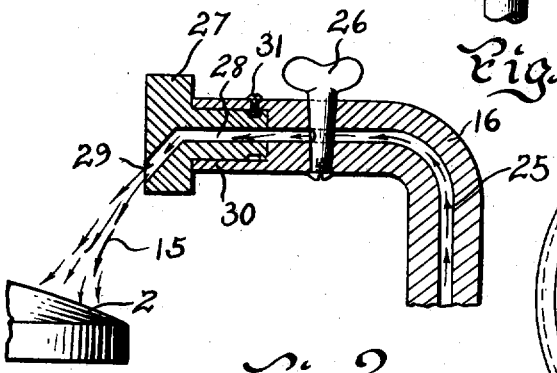
Figure 2 is a partial longitudinal cross section through the abradant supplying means showing the means of directing the source of supply as well as regulating the amount of supply.
Figure 3:
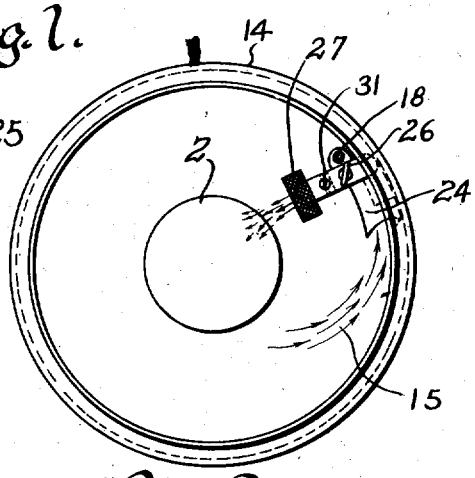
Figure 3 is a top plan view of Figure 1.

Referring to the drawings in which similar characters of reference denote similar parts throughout, the work 1, which in the present instance is an ophthalmic lens, is mounted for rotation over the surfacing tool 2. The surfacing tool 2 is carried by the spindle 3 which is rotated by the pulley 4 and the belt 5. The work 1 is rotated or carried over the tool 2 by means of the spindle 6 rotated by the pulley 7 and the belt 8. An offset crank arm or pin 9 is carried by the spindle 6. This crank arm has a locating pin 10 which fits into a loose bearing recess 11 in the work holder 12 which is secured to the work 1, by a cement or pitch layer 13. The crank 9 being offset from the spindle 6 will tend to carry the work 1 around a circular path on the tool 2, the center of the circle being the axis of the spindle 6. The pin 10 fitting loosely into the recess 11 allows the work 1 to adjust itself to the surface of the tool 2. Surrounding the tool 2 is a pan or bowl 14 which is secured to the shaft 3 and rotates therewith. In this bowl 14 is a supply of fluid abradant 15, that is, an abradant such as rouge or emery carried in water. The bowl 14 being rotated by the spindle 3 carries the liquid abradant around with it and has a tendency to throw it up at the sides due to centrifugal force. In the path of the abradant 15 which is being thrown up at the sides as described is placed a scoop member 16 which is supported by a rod 17 carried by the bracket rod 18 and bracket 19. The bracket rod 18 may be moved up and down in the bracket 19 in the bearings 20 and locked in position by the set screw 21.

The rod 17 may be moved back and forth in its bearings in the rod 18 at the point 22 and locked in position by the set screw 21. The rod 17 may be rotated by turning the rod 18 in its bearings 20 as a center. These adjustments of the rod 17 permit the scoop apron 24 to be positioned in the path of the moving abradant 15. There is a central opening or channel 25 in the member 16 through which the abradant 15 is forced by the movement of the bowl 14. To regulate the amount of abradant that is allowed to pass through the channel 25 in the member 16 there is a spigot or cock 26 located in the member 16 so that by turning the same the amount of abradant passing through the channel beyond the spigot 26 will be regulated. To determine the direction at which the flowing abradant will be delivered from the channel 25 there is supplied at the end of the member 16 a revolvable turn button 27 having a central opening or channel 28 in line with the channel 25 and an offset opening or spout 29 communicating with the channel 28. The fluid abrasive is emitted from the spout 29 onto the tool 2. To regulate the direction in which the fluid abrasive will be delivered from the spout 29 the turn button 27 may be turned in its bearings 30 in the member 16 to position the opening or orifice 29 as desired and the turn button may be locked in said position by means of the set screw 31.

It will, therefore, be seen that the direction at which the fluid abrasive is delivered to the tool may be regulated by turning the turn button 27 and the amount of the abrasive may be regulated by turning the spigot 26 and the member 16 may be positioned in the path of the flowing abradant 15 by the proper adjustment of the rod 17, as has been hitherto described.

From the foregoing description it will be seen that I have provided simple, inexpensive and efficient means for carrying out the objects of this invention and particularly for regulating the direction of the supply of abradant and the amount thereof.

Having described my invention, I claim:

1. In combination with a rotatable bowl containing a fluid abrasive, an abrasive scoop member comprising a pipe portion having an internal channel, a scoop apron at one end and an internal annular shoulder at the other end, a nozzle member having an annular barrel portion fitting the internal shoulder of the pipe member and having an external projecting portion and a transverse recessed groove on the barrel portion, a member projecting through the pipe portion into the recessed groove on the barrel portion whereby the barrel portion may be turned within the annular shoulder portion without separation of the parts, said nozzle member having a central channel portion aligning with the channel portion of the pipe member and an offset channel portion intersecting the first channel portion and opening through the extending portion of the nozzle member, and means to support the abrasive scoop member within the bowl in operative related position with the walls of the bowl.

2. In combination with a rotatable bowl containing a fluid abrasive, an abrasive scoop member comprising a pipe portion having an internal channel, a scoop apron at one end and an internal annular shoulder at the other end, a nozzle member having an annular barrel portion fitting the internal shoulder of the pipe member and having an external projecting portion and a transverse recessed groove on the barrel portion, screw means projecting through the pipe portion into the recessed groove on the barrel portion whereby the barrel portion may be turned within the annular shoulder portion without separation of the parts, said nozzle member having a central channel portion aligning with the channel portion of the pipe member and an offset channel portion intersecting the first channel portion and opening through the extending portion of the nozzle member, means to support the abrasive scoop member within the bowl in operative related position with the walls of the bowl, and means intermediate the ends of the scoop member for regulating the amount of abrasive passing through the internal channel thereof.

3. In combination with a rotatable bowl adapted to contain a fluid abrasive, an abrasive scoop member having a pipe portion with an internal channel through which the fluid abrasive may flow, adjustable support means supporting said scoop member in required related position with the wall of the bowl, operable means associated with the pipe portion by which the direction of the flow of the fluid abrasive from the channel therein may be changed, and an apron on the scoop member having a portion positioned in relation to the channel opening so that abrasive deflected by the mouth of the channel opening and not going through the channel will be prevented from flying into the working parts of the machine.

4. In combination with a rotatable bowl adapted to contain a fluid abrasive, an abrasive scoop member comprising a pipe portion having an internal channel member having one end positioned to scoop up the fluid abrasive and a nozzle connecting portion adjacent the other end thereof, a nozzle member having a portion rotatably fitting the nozzle connecting portion of the pipe and having a projecting nozzle portion, said nozzle member having an internal channel leading from the pipe portion through the nozzle portion, means to support the scoop member within the bowl in operative related position with the wall of the bowl, and an apron on the scoop member having a portion positioned in relation to the channel opening so that abrasive deflected by the mouth of the channel opening and not going through the channel will be prevented from flying into the working parts of the machine.

In testimony whereof, I have affixed my signature.

ALBERT E. MAYNARD.